(12) United States Patent
Chang et al.

(10) Patent No.: US 7,744,238 B2
(45) Date of Patent: Jun. 29, 2010

(54) INPUT DEVICE HAVING MULTI-STAGE INDICATING LAMP

(75) Inventors: A-Ming Chang, Taipei (TW);
Chou-Liang Liu, Taipei (TW);
Chih-Wen Su, Taipei (TW);
Chien-Pang Chien, Taipei (TW);
Ying-Che Tseng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 143 days.

(21) Appl. No.: 12/236,119

(22) Filed: Sep. 23, 2008

(65) Prior Publication Data
US 2009/0316427 A1 Dec. 24, 2009

(30) Foreign Application Priority Data
Jun. 20, 2008 (TW) .............................. 97123122 A

(51) Int. Cl.
*B25B 23/18* (2006.01)
(52) U.S. Cl. .......................... 362/119; 362/85; 345/163
(58) Field of Classification Search ................ 362/119, 362/555, 257, 253, 85; 345/163, 170, 169
See application file for complete search history.

(56) References Cited

U.S. PATENT DOCUMENTS

| | | | | |
|---|---|---|---|---|
| 5,973,671 A | * | 10/1999 | Kuo ........................... 345/157 |
| 6,575,586 B1 | * | 6/2003 | Tsau ........................... 362/85 |
| 6,771,253 B2 | * | 8/2004 | Wu ............................. 345/170 |
| 2003/0067758 A1 | * | 4/2003 | Shipman ...................... 362/26 |
| 2007/0211030 A1 | * | 9/2007 | Hong et al. ................... 345/163 |

* cited by examiner

*Primary Examiner*—Jong-Suk (James) Lee
*Assistant Examiner*—Julie A Shallenberger
(74) *Attorney, Agent, or Firm*—Kirton & McConkie; Evan R. Witt

(57) ABSTRACT

The present invention relates to an input device having a multi-stage indicating lamp. The input device includes a case and an electronic lighting module. The electronic lighting module includes a printed circuit board, a first electronic lighting element, a second electronic lighting element, a light guide post member, a light-shielding member, a lamp cover and a button. By means of the light guide post member and the light-shielding member, the possibility of scattering the light beams is reduced.

9 Claims, 5 Drawing Sheets

INPUT DEVICE HAVING MULTI-STAGE INDICATING LAMP

FIELD OF THE INVENTION

The present invention relates to an input device, and more particularly to an input device having a multi-stage indicating lamp.

BACKGROUND OF THE INVENTION

Nowadays, with increasing development of high technology industries, electronic devices are widely used in our daily lives. For most electronic devices, a variety of electronic lighting elements are used to generate light signals to notify the user. For example, a red light signal is shown if an electric hot-water heater is cooking water. After the water contained in the electric hot-water heater has been boiled, the red light signal is switched to a green light signal to notify the user that the water has been boiled and is now feasible to drink. The examples of using electronic lighting elements in electronic devices to notify the users are too numerous to be enumerated.

Recently, the electronic device using a single electronic lighting element to generate the light signal is not satisfactory. The electronic devices using multi-stage electronic lighting modules to generate multi-stage light signals. A multi-stage electronic lighting module contains numeral electronic lighting elements, in which one or more of the electronic lighting elements selectively illuminate to create different light signals or different lighting effects, thereby generating many kinds of prompts. For example, a multifunction peripheral has multiple light signals to indicate different working modes. When the multifunction peripheral is switched from a working mode to another working mode, different number of light signals will be generated. For example, when the multifunction peripheral is in a scanner mode, a light signal is generated; when the multifunction peripheral is in a copier mode, two light signals are generated; and when the multifunction peripheral is in a printer mode, three light signals are generated. Moreover, the multi-stage electronic lighting module is applicable to computer peripheral devices such as mice, keyboards or other input devices.

During operation of the multi-stage electronic lighting module, the light beams emitted by different electronic lighting elements are possibly interfered with each other. In other words, the light beams emitted by an electronic lighting element may be scattered such that portions of light beams are projected to adjacent electronic lighting element. Under this circumstance, a so-call light leakage problem occurs. Hereinafter, the structure of the multi-stage electronic lighting module of an input device and the light leakage problem occurred in the electronic lighting elements will be illustrated in more details with reference to FIG. 1.

FIG. 1 is a schematic cross-sectional view of an input device having a multi-stage indicating lamp according to the prior art. The input device 1 principally comprises a case 14 and an electronic lighting module. A plurality of case perforations 141 are formed in the case 14. The electronic lighting module comprises a printed circuit board 10, a first electronic lighting element 11, a second electronic lighting element 12, a light guide post member 13 and multiple partition plates 15. The light guide member 13 comprises a light guide platform 131 and multiple light guide posts 132. The first electronic lighting element 11 and the second electronic lighting element 12 emit first light beams B1 and second light beams B2, respectively.

In the input device 1 having a multi-stage indicating lamp, the first electronic lighting element 11 and the second electronic lighting element 12 are disposed on the printed circuit board 10 and aligned with the light guide posts 132 of the light guide member 13. Consequently, the light beams B1 and B2 emitted by the electronic lighting elements 11 and 12 are guided by the light guide posts 132 of the light guide member 13. The upper terminals of the light guide posts 132 are inserted into corresponding case perforations 141 of the case 14. Every two adjacent light guide posts 132 are separated by a partition plate 15. When the light beams B1 and B2 emitted by the electronic lighting elements 11 and 12 are guided by respective light guide posts 132 of the light guide member 13 and exited from the case perforations 141, the partition plates 15 may block the light beams B1 and B2 from being scattered to adjacent light guide posts 132. That is, the partition plates 15 used in the input device 1 may facilitate avoiding or minimizing the light leakage problem. The conventional input device 1, however, still has some drawbacks. For example, since the light guide platform 131 of the light guide member 13 is made of transparent material, some of the light beams B1 and B2 are not blocked by the partition plates 15 and possibly scattered out of the light guide platform 131. Under this circumstance, the light leakage problem still occurs.

Therefore, there is a need of providing an input device having a multi-stage indicating lamp for minimizing the light leakage problem.

SUMMARY OF THE INVENTION

It is an object of the present invention to provide an input device having a multi-stage indicating lamp, in which the light beams emitted by different electronic lighting elements of the electronic lighting module are minimally or no longer interfered with each other.

In accordance with an aspect of the present invention, there is provided an input device having a multi-stage indicating lamp. The input device includes a case and an electronic lighting module. The case has a plurality of case perforations and multiple case ribs. Each case rib is arranged between two adjacent case perforations. The electronic lighting module is used for providing different light signals, and includes a printed circuit board, a first electronic lighting element, a second electronic lighting element, a light guide member and a light-shielding member. The printed circuit board has a board hole. The first electronic lighting element is arranged on the printed circuit board for emitting first light beams. The second electronic lighting element is arranged on the printed circuit board for emitting second light beams. The light guide member includes a light guide platform, multiple upper light guide posts for guiding the first and second light beams, and multiple lower light guide posts for guiding the first and second light beams. The upper light guide posts are inserted into corresponding case perforations such that the case ribs are embedded into corresponding gaps between adjacent upper light guide posts. The number of the upper light guide posts is the same as the number of the lower light guide posts. The light-shielding member is arranged between the light guide member and the printed circuit board and includes multiple channels and a light-shielding rib. The lower light guide posts are inserted into corresponding channels. The light-shielding rib is received in the board hole.

In an embodiment, the light guide platform further includes multiple light guide holes. Each of the light guide holes is arranged between two adjacent upper light guide posts.

In an embodiment, multiple upper light-shielding ribs are formed on an upper surface of the light-shielding member. Each of the upper light-shielding ribs is arranged between two adjacent channels.

In an embodiment, the input device further includes a lamp cover, which is disposed on a surface of the case, for sheltering the case perforations.

In an embodiment, the input device further includes a button, which is disposed on a surface of the case. A mode-switching signal is generated when the button is pressed down by a user.

In an embodiment, the input device further includes a control unit, which is mounted on the printed circuit board and receives the mode-switching signal. The control unit controls the first electronic lighting element to individually emit the first light beams, the second electronic lighting element to individually emit the second light beams or the first and second electronic lighting elements to simultaneously emit the first light beams according to the mode-switching signal.

Preferably, the input device is a mouse.

Preferably, the first electronic lighting element is a light emitting diode (LED).

Preferably, the second electronic lighting element is a light emitting diode (LED).

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
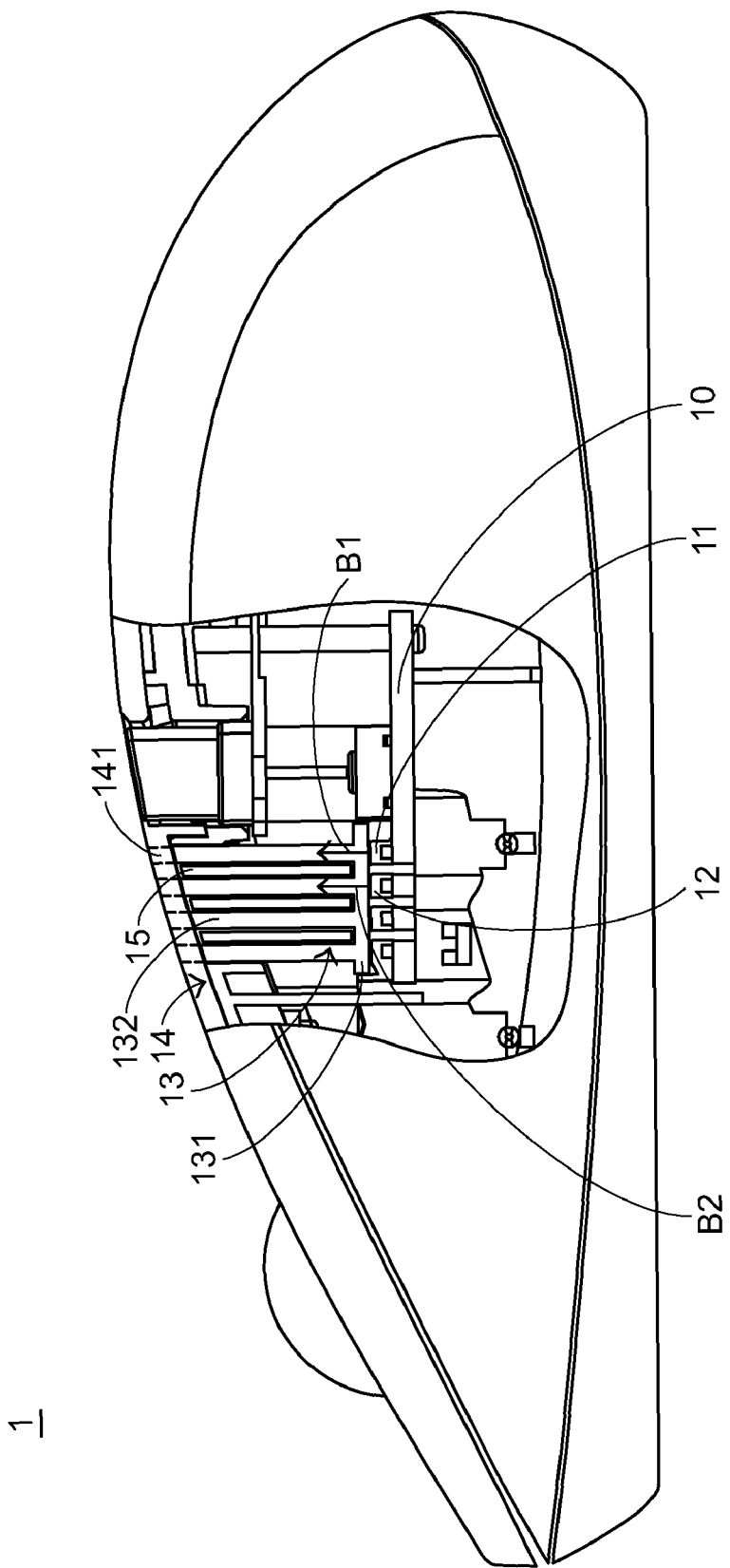
FIG. 1 is a schematic cross-sectional view of an input device having a multi-stage indicating lamp according to the prior art.
Figure 2:
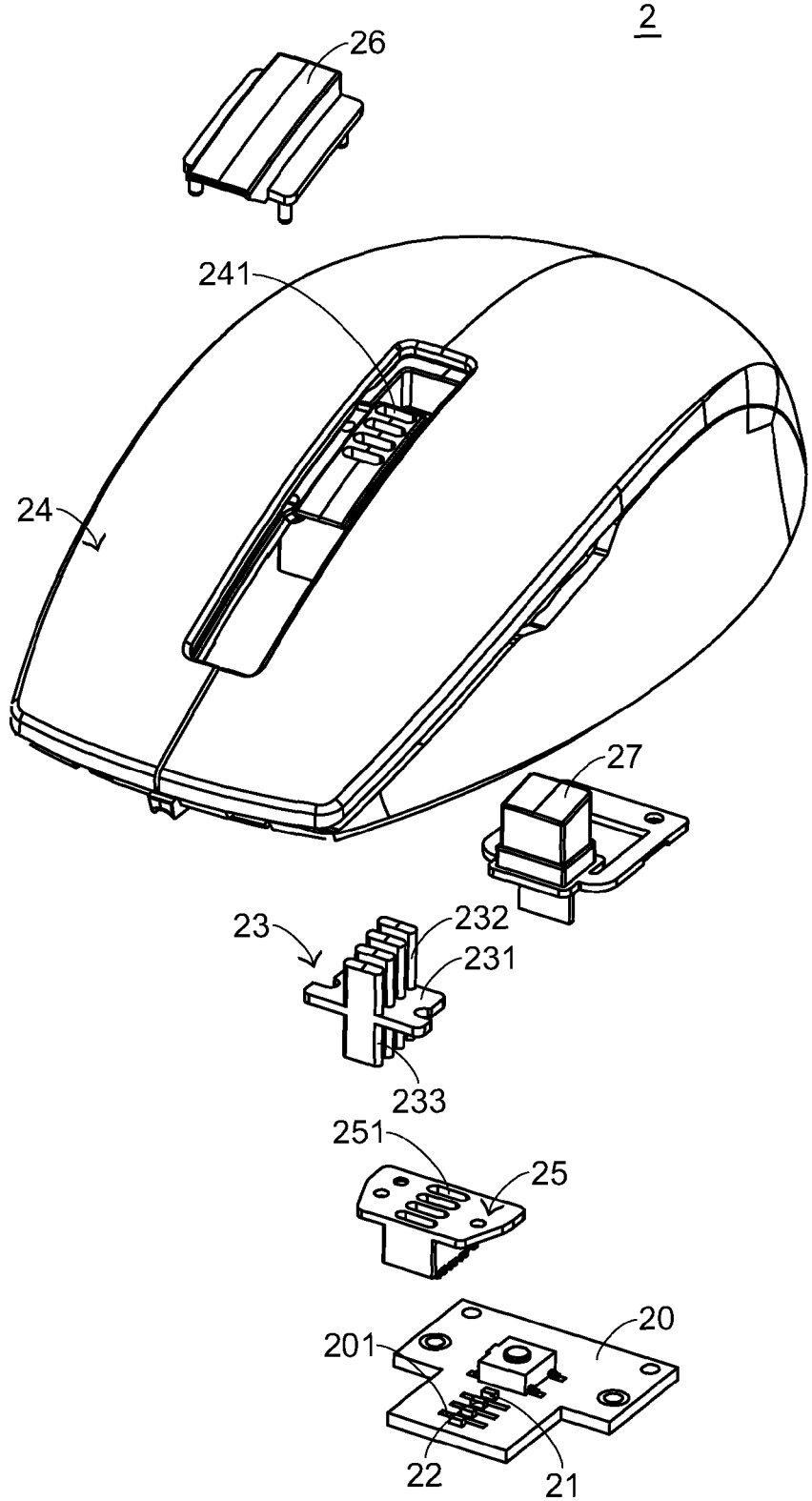
FIG. 2 is a schematic exploded view of an input device having a multi-stage indicating lamp according to a first preferred embodiment of the present invention.
Figure 3:
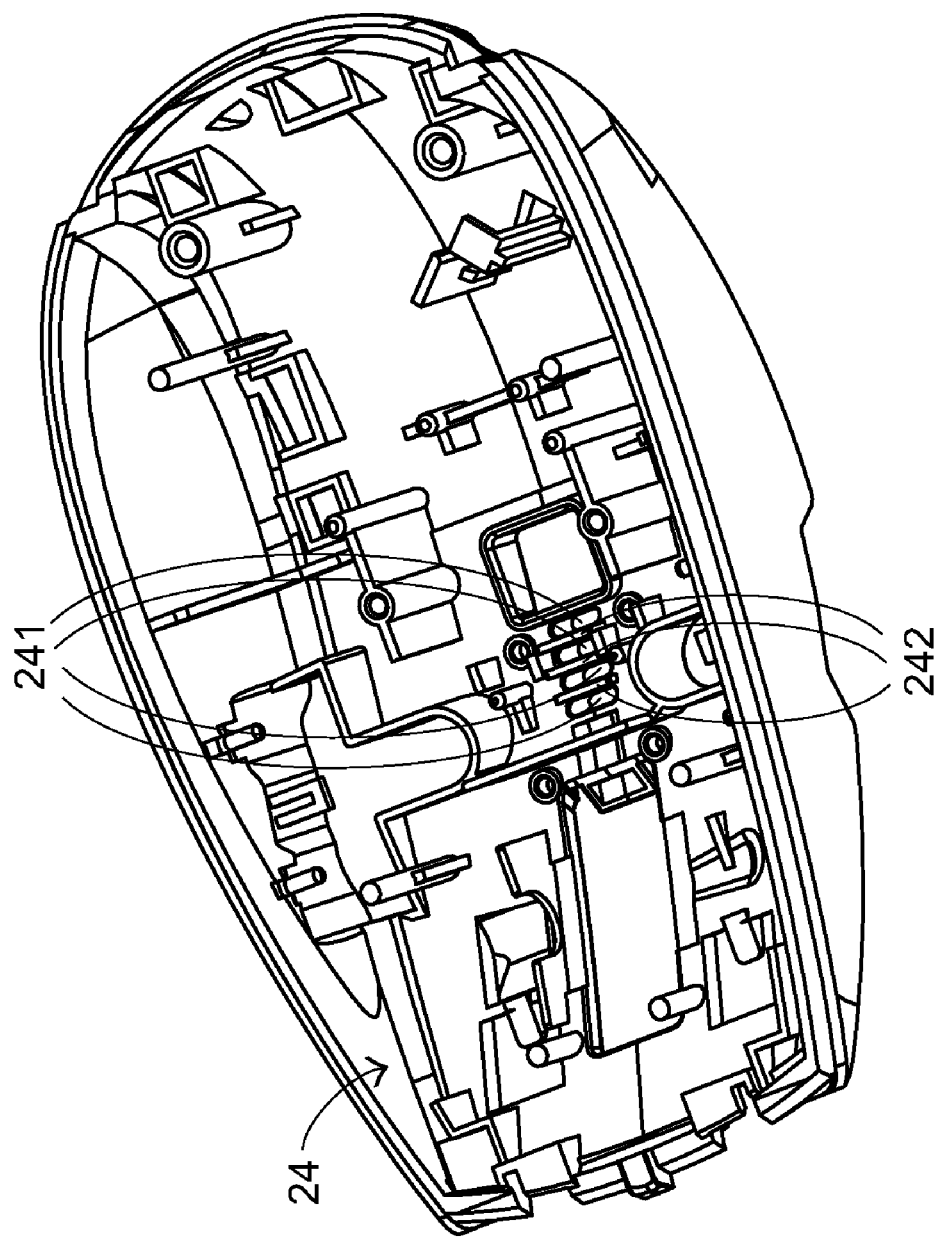
FIG. 3 is a schematic perspective view illustrating the case of the input device shown in FIG. 2 taken in a different viewpoint.
Figure 4:
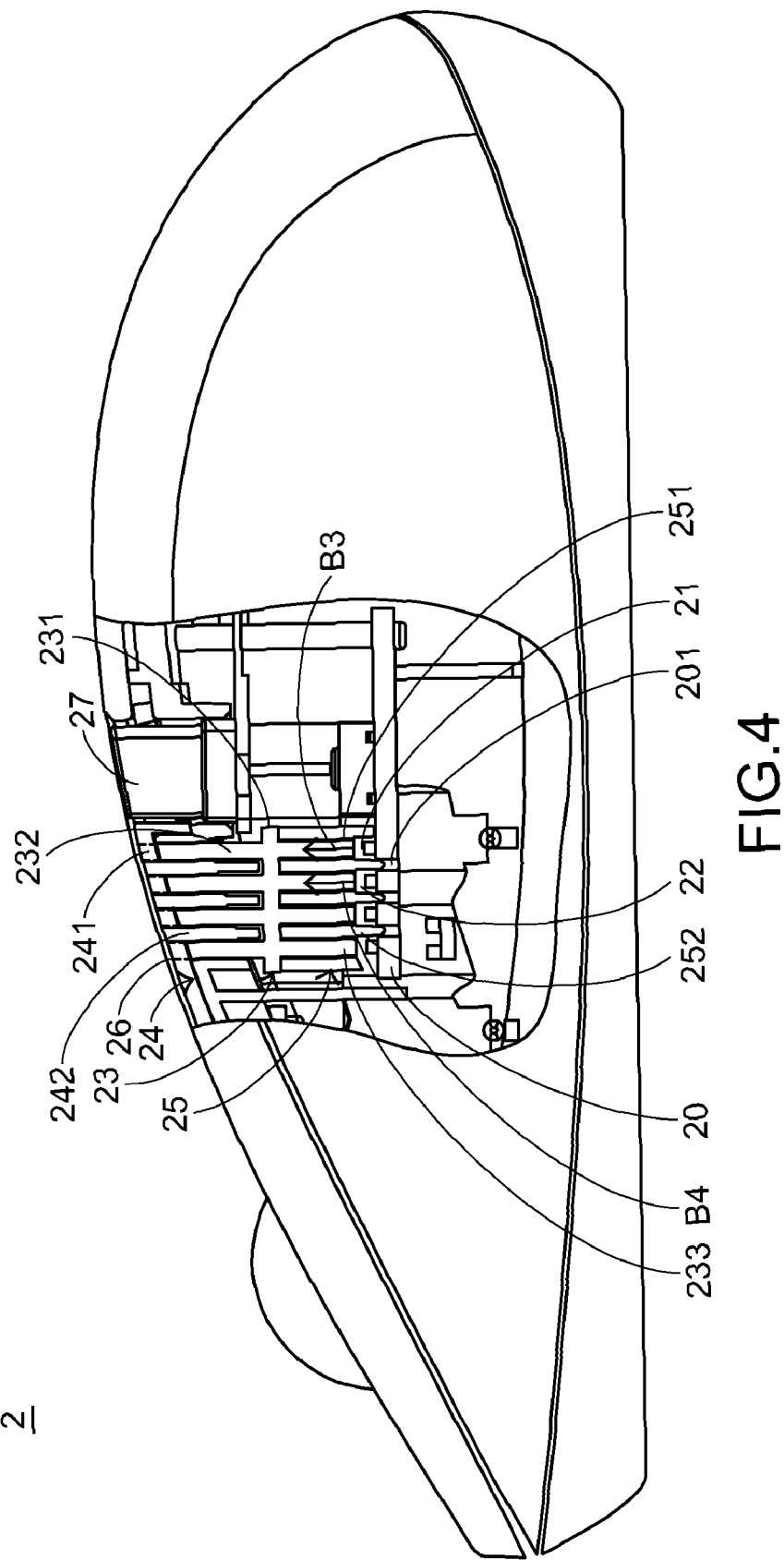
FIG. 4 is a schematic cross-sectional and assembled view illustrating the input device shown in FIG. 2.

FIG. 2 is a schematic exploded view of an input device having a multi-stage indicating lamp according to a first preferred embodiment of the present invention. FIG. 3 is a schematic perspective view illustrating the case of the input device shown in FIG. 2 taken in a different viewpoint. FIG. 4 is a schematic cross-sectional and assembled view illustrating the input device shown in FIG. 2. Please refer to FIGS. 2, 3 and 4.

In this embodiment, the input device 2 principally comprises a case 24 and an electronic lighting module. A plurality of case perforations 241 are formed in the case 24. The electronic lighting module comprises a printed circuit board 20, a first electronic lighting element 21, a second electronic lighting element 22, a light guide post member 23, a light-shielding member 25, a lamp cover 26 and a button 27. Multiple board holes 201 are formed in the printed circuit board 20. The light guide member 23 comprises a light guide platform 231, multiple upper light guide posts 232 and multiple lower light guide posts 233. The light-shielding member 25 has multiple channels 251 and multiple light-shielding ribs 252. The first electronic lighting element 21 and the second electronic lighting element 22 are disposed on the printed circuit board 20 for emitting first light beams B3 and second light beams B4, respectively. Examples of the first electronic lighting element 21 and the second electronic lighting element 22 are light emitting diodes (LEDs). The light-shielding member 25 of the input device 2 is used for preventing the light beams emitted by the electronic lighting elements from being interfered with each other so as to minimize the light leakage problem. For complying with the light-shielding member 25, the components included in the input device 2 are modified. In the light guide member 23, the number of the upper light guide posts 232 is the same as the number of the lower light guide posts 233. In addition, the upper light guide posts 232 are aligned with corresponding lower light guide posts 233. After the lower light guide posts 233 are inserted into corresponding channels 251, the light guide member 23 is combined with the light-shielding member 25. In addition, the light-shielding ribs 252 of the light-shielding member 25 are received in corresponding board holes 201 of the printed circuit board 20.

In addition, the case 24 has multiple case ribs 242. Each case rib 242 is arranged between two adjacent case perforations 241. When the upper light guide posts 232 of the light guide member 23 are inserted into corresponding case perforations 241, the case ribs 242 are embedded into corresponding gaps between adjacent upper light guide posts 232 so as to block the first light beams B3 and the second light beams B4, as can be seen in FIG. 3.

Hereinafter, the functions of the components included in the input device 2 will be illustrated in more details with reference to FIG. 4. In the input device 2 having a multi-stage indicating lamp according to a first preferred embodiment of the present invention, the printed circuit board 20 is combined with the light-shielding member 25, the light guide member 23 is also combined with the light-shielding member 25, and the light guide member 23 is combined with the case 24. The light-shielding ribs 252 of the light-shielding member 25 are received in corresponding board holes 201 of the printed circuit board 20 so that the printed circuit board 20 is combined with the light-shielding member 25. After lower light guide posts 233 are inserted into corresponding channels 251, the light guide platform 231 is contacted with the light-shielding member 25 and the light guide member 23 is combined with the light-shielding member 25. After the upper light guide posts 232 of the light guide member 23 are inserted into corresponding case perforations 241 and the light guide platform 231 is fixed on the case 24, the light guide member 23 is combined with the case 24.

Please refer to FIG. 4 again. The first electronic lighting element 21 is disposed on the printed circuit board 20 for emitting the first light beams B3. The second electronic lighting element 22 is disposed on the printed circuit board 20 for emitting the second light beams B4. The first light beams B3 are guided by the lower light guide post 233 which is directly above the first electronic lighting element 21. The second light beams B4 are guided by the lower light guide post 233 which is directly above the second electronic lighting element 22. Since these two lower light guide posts 233 are separated by corresponding light-shielding ribs 252 of the light-shielding member 25, the first light beams B3 and the second light beams B4 will no longer be interfered with each other. Moreover, the case ribs 242 of the case 24 are embedded into corresponding gaps between the light guide posts 232 for guiding the light beams B3 and B4. The case ribs 242 may facilitate blocking the first light beams B3 and the second light beams B4 so as to minimize the light leakage problem.

Figure 5:
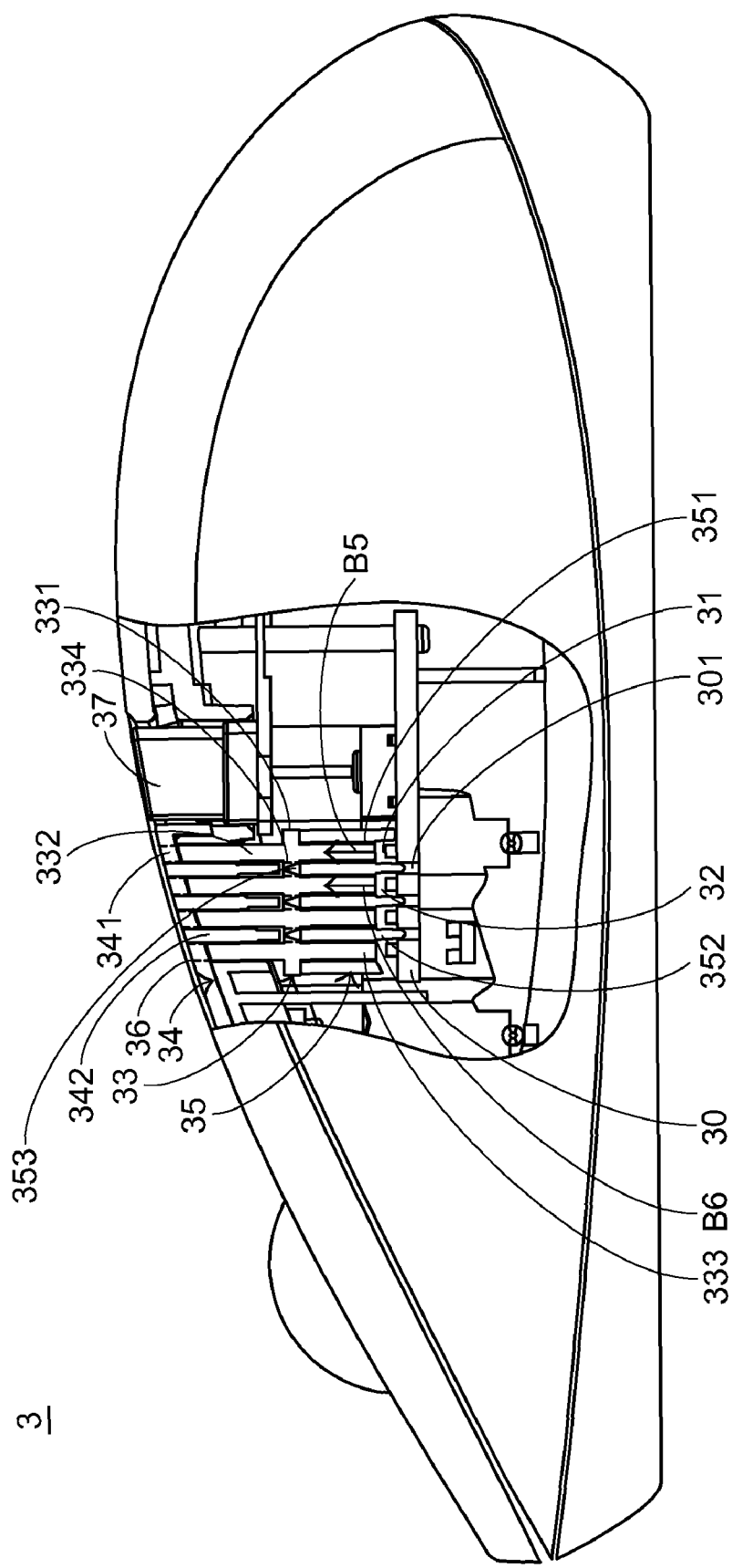
FIG. 5 is a schematic cross-sectional and assembled view illustrating an input device having a multi-stage indicating lamp according to a second preferred embodiment of the present invention

The light-shielding member 25 of the first preferred embodiment, however, still fails to fully solve the light leakage problem. For further minimizing the light leakage problem, an input device having a multi-stage indicating lamp according to a second preferred embodiment of the present invention will be illustrated with reference to a schematic cross-sectional and assembled view of FIG. 5. As shown in FIG. 5, the input device 3 principally comprises a case 34 and an electronic lighting module. A plurality of case perforations 341 are formed in the case 34. The electronic lighting module comprises a printed circuit board 30, a first electronic lighting element 31, a second electronic lighting element 32, a light guide post member 33, a light-shielding member 35, a lamp cover 36 and a button 37. Likewise, multiple board holes 301 are formed in the printed circuit board 30. The light guide member 33 comprises a light guide platform 331, multiple upper light guide posts 332 and multiple lower light guide posts 333. The light-shielding member 35 has multiple channels 351 and multiple light-shielding ribs 352. The first electronic lighting element 31 and the second electronic lighting element 32 are disposed on the printed circuit board 30 for emitting first light beams B5 and second light beams B6, respectively. In comparison with the first preferred embodiment, the light guide platform 331 further comprises light guide holes 334. Each light guide hole 334 is arranged between two upper light guide posts 332. In addition, multiple upper light-shielding ribs 353 are formed on an upper surface of the light-shielding member 35. Each upper light-shielding rib 353 is arranged between two adjacent channels 351. In the input device 3 having a multi-stage indicating lamp, the upper light-shielding ribs 353 are inserted into corresponding light guide holes 334 of the light guide member 33 so that the light guide member 33 is combined with the light-shielding member 35. Since the paths of scattering the first light beams B5 and the second light beams B6 are shielded by the upper light-shielding ribs 353, the first light beams B5 and the second light beams B6 fail to be scatted within the transparent light guide post member 33 and the first light beams B5 and the second light beams B6 will no longer be interfered with each other. As is shown in FIG. 5, since every two adjacent light guide posts of the light guide post member 33 are separated by the upper light-shielding ribs 353, most of the scattered light beams are blocked and the efficacy of preventing light leakage is enhanced.

Please refer to FIGS. 2 and 4 again. The input device 2 of the present invention further comprises a lamp cover 26 and a button 27. The lamp cover 26 is arranged on the surface of the case 24 for offering dust-proof and aesthetic functions. When the button 27 is pressed down by the user, a mode-switching signal is generated. The input device 2 of the present invention further comprises a control unit (not shown), which is mounted on the printed circuit board 20, for receiving the mode-switching signal. In receipt of the mode-switching signal, the control unit will control the indicating statuses of the light signals. In other words, the control unit of the input device of the present invention may control different electronic lighting elements to illuminate according to different mode-switching signals. For example, in a case that the button 27 has not been pressed down, the first electronic lighting element 21 may emit the first light beams B3. In a case that the button 27 is pressed down by the user for a first time, two light signals are created. Under this circumstance, the second electronic lighting element 22 may also emit the second light beams B4. In another case the button 27 is pressed down by the user for a second time, three light signals are created. The rest may be deduced by analog. In the above embodiments, the present invention is illustrated by referring to create different numbers of light signals in different working modes. Nevertheless, the electronic lighting elements of the input device of the present invention may generate special-effect light signals (e.g. flashing light beams) according to different mode-switching signals. The input device 3 of the second preferred embodiment of the present invention further comprises a lamp cover 36 and a button 37. The functions of the lamp cover 36 and the button 37 included in the second preferred embodiment are similar to those shown in the first preferred embodiment, and are no redundantly described herein.

Moreover, the working modes of the input device of the present invention are switched by operating the button. Take a resolution-controllable optical input device having four resolution modes for example. When the input device is activated, the input device is operated in a predetermined first resolution mode. In a case that the button is pressed down by the user for the first time, the input device is switched to a second resolution mode. In a case that the button is pressed down by the user for the second time, the input device is switched to a third resolution mode. In a case that the button is pressed down by the user for the third time, the input device is switched to a fourth resolution mode. In other words, the input device of the present invention may be operated in different working modes according to different situations, and different numbers of light signals or different lighting effects may be created in different working modes.

From the above description, the input device having a multi-stage indicating lamp according to the present invention can minimize the light leakage problem by using the light-shielding member to block the block the light beams from being scattered to adjacent light guide posts. Moreover, the input device of the present invention may be operated in different working modes according to the user's requirements and the multi-stage light signals are generated according to different working modes. In comparison with the conventional input device, the input device having a multi-stage indicating lamp according to the present invention can largely reduce light leakage so as obviate the drawbacks encountered from the prior art.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An input device having a multi-stage indicating lamp, said input device comprising:

a case having a plurality of case perforations and multiple case ribs, wherein each case rib is arranged between two adjacent case perforations; and an electronic lighting module for providing different light signals, and comprising:

a printed circuit board having a board hole;

a first electronic lighting element arranged on said printed circuit board for emitting first light beams;

a second electronic lighting element arranged on said printed circuit board for emitting second light beams;

a light guide member comprising a light guide platform, multiple upper light guide posts for guiding said first and second light beams, and multiple lower light guide posts for guiding said first and second light beams, wherein said upper light guide posts are inserted into corresponding case perforations such that said case ribs are embedded into corresponding gaps between adjacent upper light guide posts, and the number of said upper light guide posts is the same as the number of said lower light guide posts; and a light-shielding member arranged between said light guide member and said printed circuit board and comprising multiple channels and a light-shielding rib, wherein said lower light guide posts are inserted into corresponding channels, and said light-shielding rib is received in said board hole.

2. The input device having a multi-stage indicating lamp according to claim 1 wherein said light guide platform further comprises multiple light guide holes, each of said light guide holes being arranged between two adjacent upper light guide posts.

3. The input device having a multi-stage indicating lamp according to claim 2 wherein multiple upper light-shielding ribs are formed on an upper surface of said light-shielding member, each of said upper light-shielding ribs being arranged between two adjacent channels.

4. The input device having a multi-stage indicating lamp according to claim 1 further comprising a lamp cover, which is disposed on a surface of said case, for sheltering said case perforations.

5. The input device having a multi-stage indicating lamp according to claim 1 further comprising a button, which is disposed on a surface of said case, wherein a mode-switching signal is generated when said button is pressed down by a user.

6. The input device having a multi-stage indicating lamp according to claim 5 further comprising a control unit, which is mounted on said printed circuit board and receives said mode-switching signal, wherein said control unit controls said first electronic lighting element to individually emit said first light beams, said second electronic lighting element to individually emit said second light beams or said first and second electronic lighting elements to simultaneously emit said first light beams according to said mode-switching signal.

7. The input device having a multi-stage indicating lamp according to claim 1 wherein said input device is a mouse.

8. The input device having a multi-stage indicating lamp according to claim 1 wherein said first electronic lighting element is a light emitting diode (LED).

9. The input device having a multi-stage indicating lamp according to claim 1 wherein said second electronic lighting element is a light emitting diode (LED).

* * * * *